United States Patent [19]

Pringle

[11] 4,233,893
[45] Nov. 18, 1980

[54] BONDING APPARATUS FOR BRAKE LININGS

[75] Inventor: William L. Pringle, Grosse Pointe Shores, Mich.

[73] Assignee: Leonard Friedman, Beverly Hills, Calif.

[21] Appl. No.: 55,454

[22] Filed: Jul. 6, 1979

[51] Int. Cl.³ .............................................. B30B 15/34
[52] U.S. Cl. .................. 100/93 PB; 156/556; 156/557; 156/583.1; 269/909
[58] Field of Search ............ 156/499, 556, 557, 583.1, 156/580; 269/321 B, 153; 100/93 PB; 29/233

[56] References Cited
U.S. PATENT DOCUMENTS

| | | | |
|---|---|---|---|
| 2,478,405 | 8/1949 | Kuzmick | 100/93 PB |
| 2,489,496 | 11/1949 | O'Brien | 100/93 PB |
| 2,569,737 | 10/1951 | Spanich | 100/93 PB |
| 2,655,974 | 10/1953 | Heintz, Jr. | 100/93 PB |
| 2,726,974 | 12/1955 | Lupton et al. | 100/93 PB |
| 2,982,332 | 5/1961 | Garrett | 100/93 PB |
| 3,434,412 | 3/1969 | Katz | 100/93 PB |

Primary Examiner—Michael G. Wityshyn
Attorney, Agent, or Firm—Barnes, Kisselle, Raisch & Choate

[57] ABSTRACT

An apparatus for bonding brake linings to the tables of brake shoes for heavy duty vehicles by applying heat and pressure. A pair of brake shoes received in movable carrier members are forced by a ram into engagement with brake linings received in a pair of spaced apart restrainer members located in opposed face to face relationship. The brake shoes are heated to a bonding temperature by a pair of movable electric heater units associated with each restrainer member.

10 Claims, 7 Drawing Figures

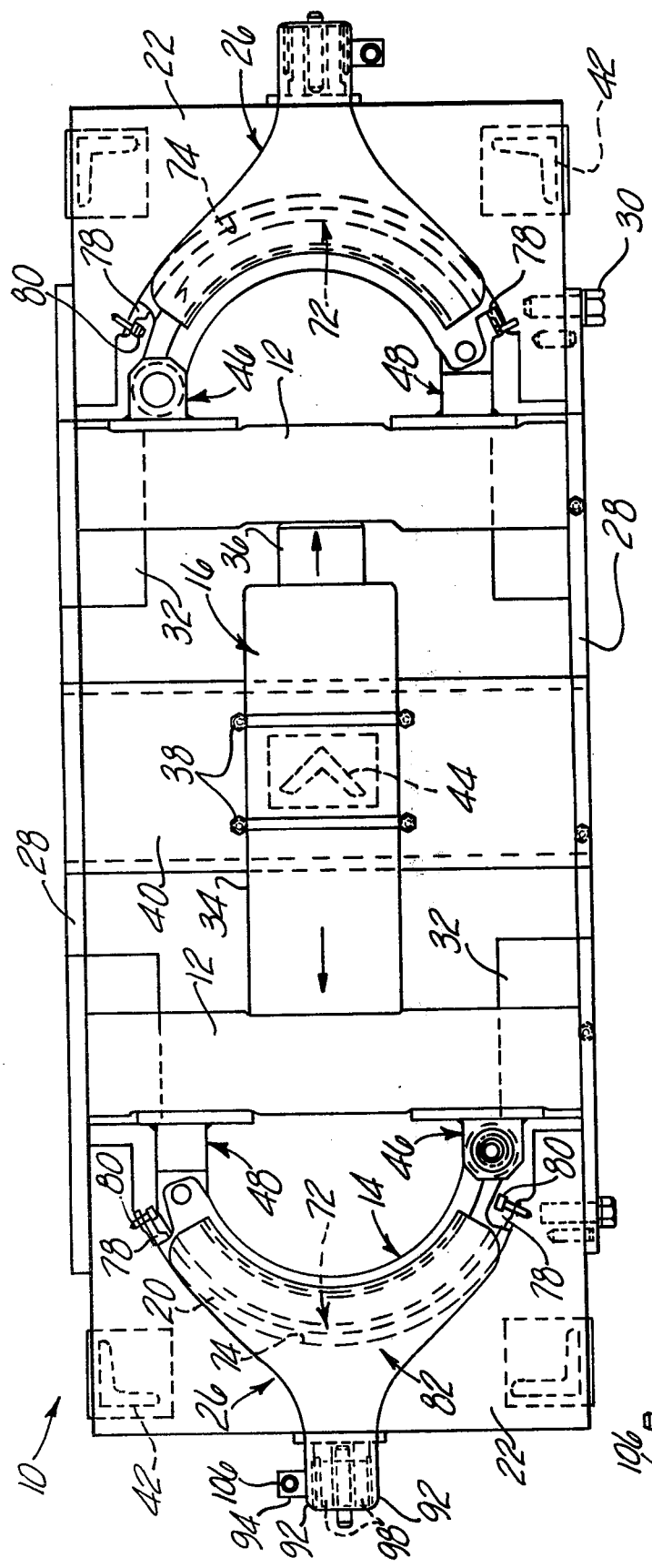

BONDING APPARATUS FOR BRAKE LININGS

This invention relates to a bonding apparatus and more particularly to an apparatus for bonding brake linings to the tables of brake shoes for heavy duty vehicles.

The brake systems for heavy duty vehicles often have brake drums with a diameter in the range of about 16 to 32 inches and brake lining track widths in the range of about 4 to 10 inches, and utilize two brake shoes with each drum. Each brake shoe is usually cast of iron or steel or fabricated from steel plates and has a substantial mass usually in the range of about 12 to 100 pounds. Each brake shoe has a mounting arm or arms underlying and supporting an arcuate table to which brake blocks or linings are bonded by a bonding material interposed between the lining and the table and cured under sufficient heat and pressure to adhere the lining to the table of the shoe.

This bonding has previously been accomplished by placing the brake shoe table and lining with a suitable bonding material therebetween under a pressure in the range of about 1,000 to 2,000 pounds per square inch of the interface between the lining and the table in an appropriate heavy duty fixture and then passing the fixture with the lining and shoe therein through a gas furnace to raise the temperature of the bonding material to its curing temperature in the range of about 375° to 500° F. Thereafter the fixture with the brake shoe and lining therein is cooled to a low enough temperature usually in the range of about 225° to 275° F. to assure complete bonding, and subsequently the fixture is released and the brake shoe with the lining bonded thereto removed from the fixture.

The prior practice of utilizing fixtures and a conventional gas fired furnace to bond liners to the tables of shoes for heavy duty vehicles has required substantial hand labor and the maintenance of the furnace at an elevated temperature in the range of about 500° to 600° F. for a substantial period of time in order to heat the bonding material to a curing temperature. Due to the substantial mass of both the brake shoe and the fixture a substantial period of time has also been required for cooling the brake shoe and lining to a low enough temperature to assure bonding before removing the shoe and bonded liner from the fixture. These factors make the prior bonding technique a relatively expensive and time consuming operation which requires a substantial investment in fixtures, furnaces, conveyors, and other manufacturing equipment.

Objects of this invention are to provide a comparatively inexpensive apparatus for bonding brake linings to the tables of shoes for heavy duty vehicles which significantly decreases the time and expense required for the bonding operation, requires substantially less capital investment, significantly decreases the amount of time and labor required to perform a bonding operation, and results in improved adhesion of linings to tables of brake shoes of heavy duty vehicles.

These and other objects, features and advantages of this invention will be apparent from the following detailed description, appended claims and accompanying drawings in which:

FIG. 1 is a top plan view of an apparatus embodying this invention;

FIG. 2 is a fragmentary side view of the apparatus of FIG. 1;

Figure 3:
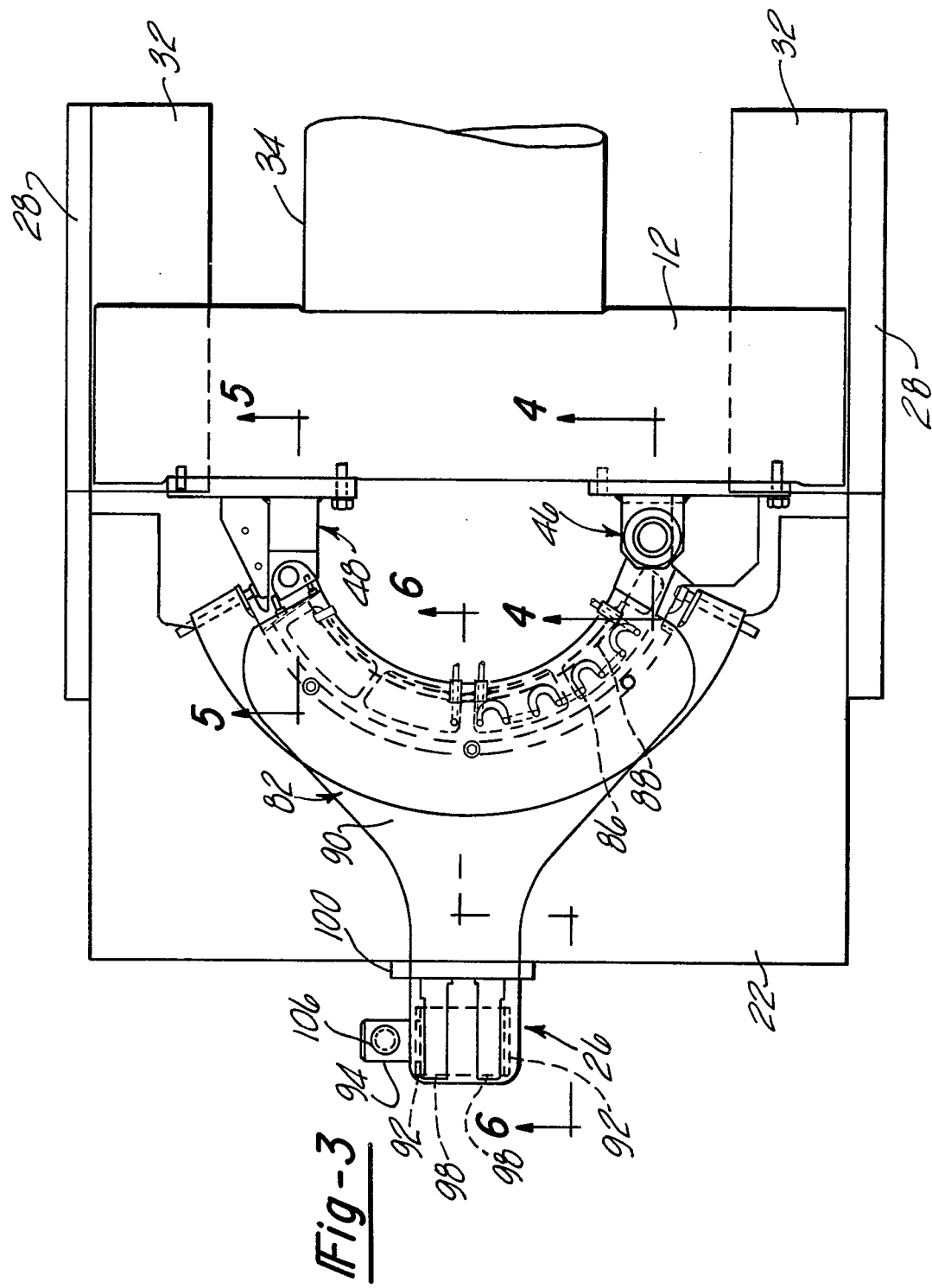
FIG. 3 is an enlarged fragmentary top view of the apparatus of FIG. 1.
Figure 4:
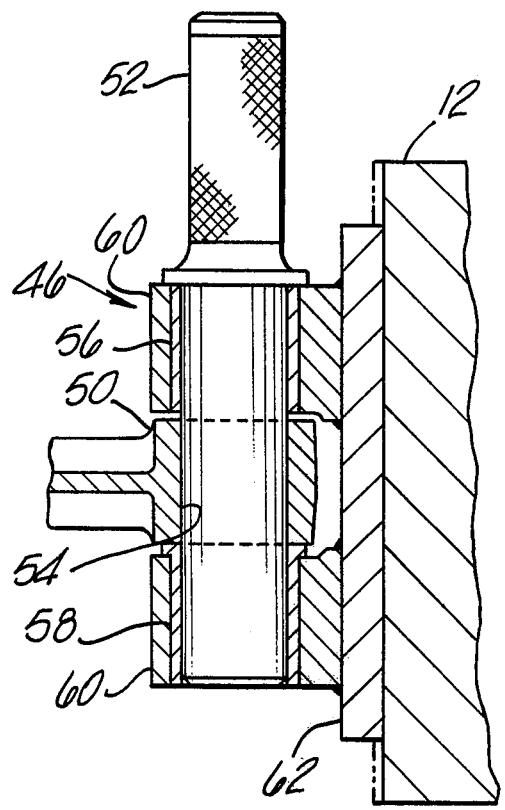
Figure 5:
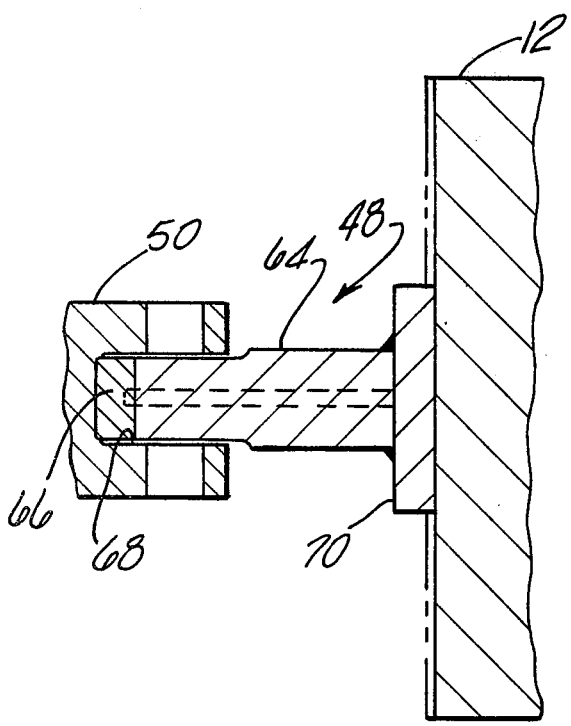
Figure 6:
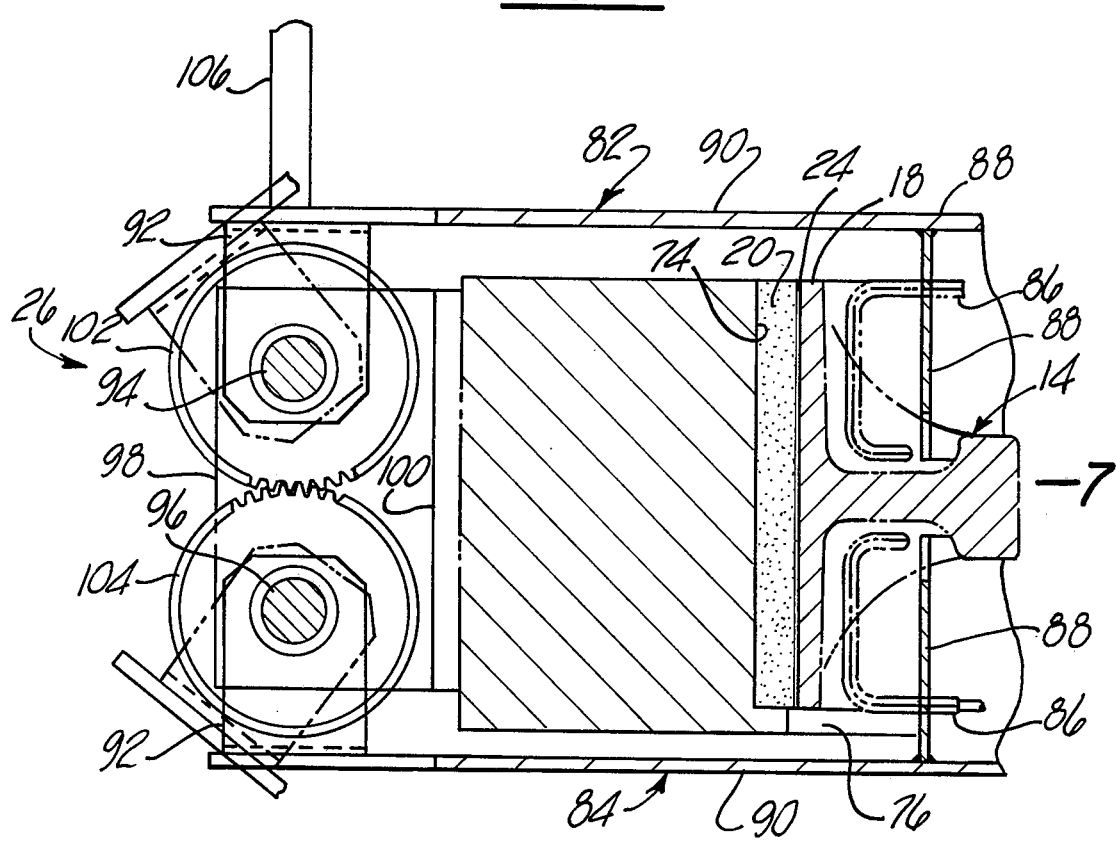
Figure 7:
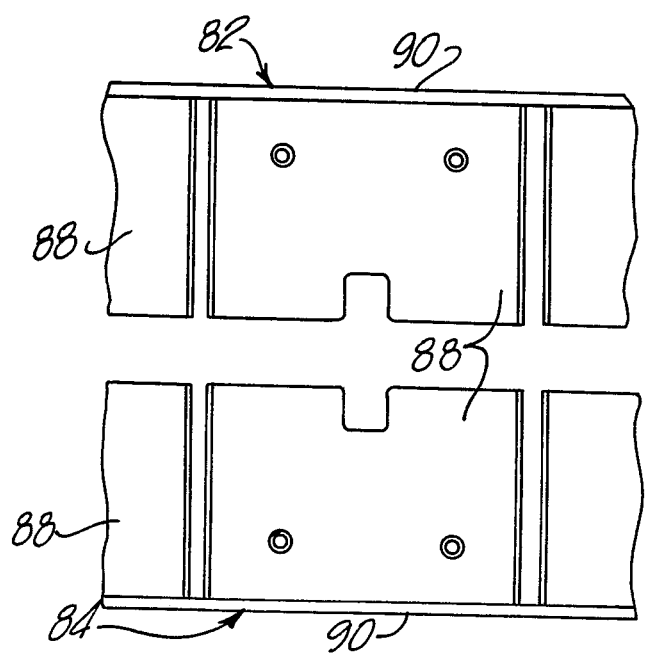

FIGS. 4, 5 and 6 are enlarged fragmentary sectional views on lines 4—4, 5—5 and 6—6 respectively of FIG. 3; and FIG. 7 is an enlarged fragmentary end view taken in the direction of arrow 7 in FIG. 6.

Referring in greater detail to the drawings, FIGS. 1 through 3 illustrate an apparatus 10 embodying this invention which has a pair of slides 12 each constructed and arranged to receive a brake shoe 14 and when actuated by ram or hydraulic cylinder 16 to force the table 18 of each brake shoe into firm engagement with brake linings 20 carried by restrainer blocks 22. A bonding material 24, interposed between the lining 20 and table 18 of each shoe, is heated to a bonding temperature by a heater assembly 26 adjacent each end of the fixture.

As shown in FIG. 1, restrainer blocks 22 are secured together in spaced apart generally opposed relation by a pair of tie bars 28 connected to the blocks by cap screws 30. Slides 12 are mounted for reciprocal movement with respect to restrainer blocks 22 by slide plates 32 fixed to the rails 28. Slides 12 are reciprocated by a hydraulic ram 16 which has one end of its cylinder 34 secured to one of the slides and the free end of its piston rod 36 secured to the other slide. To equalize the force applied to both slides 12 by the ram 16 it is mounted by U bolts 38 on a carrier plate 40 secured to rails 28 so that the cylinder 34 of the ram may move generally axially with respect to the carrier plate. Preferably, ram assembly 16 is capable of producing a force of about 200 tons, such as the hydraulic ram assembly sold under the designation Enerpac Number RR-20013 by the Enerpac Division of Applied Power Industries of Butler, Wisc. Apparatus 10 is supported at a convenient work heighth by four depending legs 42 fixed to restrainer blocks 22 and a depending leg 44 fixed to carrier plate 40.

A brake shoe 14 is positioned and releasably mounted on each slide 12 by a mounting block assembly 46 and a nose block assembly 48. As shown in FIG. 4, each mounting block assembly 46 is constructed and arranged to receive one end of an arm 50 of a brake shoe 14 which arm is releasably retained by a pin 52 extending through a hole 54 in the arm. Retainer pin 52 is slidably received in wear bushings 56 and 58 which are press fit in a pair of carrier plates 60 fixed to a base plate 62 secured to slide 12. As shown in FIG. 5, nose block assembly 48 has a locator plate 64 with a wear pad 66 on its free end which extends into and bears on the base of a slot 68 in the other end of the arm 50 of the brake shoe 14. Locator plate 64 is fixed by welds to a base plate 70 secured to slide 12.

As shown in FIGS. 1, 2 and 6 brake linings 20 prior to being bonded to shoes 14 are received in restrainer blocks 22 in a cavity 72 having an arcuate bearing wall 74 with a radius complimentary to that of the outer face of the linings and a projecting lip 76 adjacent the lower edge of the cavity on which the linings rest. Linings 20 are releasably retained in cavity 72 by spring clips 78 (FIG. 1) which bear on the opposed ends of the linings and are secured by cap screws 80 to the restrainer blocks 22.

As shown in FIGS. 2 and 6, each heater assembly 26 has pivotly mounted upper and lower units 82 and 84 which may be moved in unison to open and closed positions to locate heater elements 86 respectively either distal from or adjacent to the brake shoe 14 urged into engagement with lining 20 by the extension of slides 12. Upper and lower units 82 and 84 each have a plurality of electric heater elements 86 supported by shield plates 88 (FIGS. 6 and 7) fixed to one end of a generally Y-shaped shield and supporting arm 90, the other end of which is fixed to a pair of spaced apart mounting blocks 92. Pivot pins 94 and 96 extend through and are secured to the mounting blocks 92 of the upper and lower units respectively and are journaled for rotation in a pair of spaced apart support blocks 98 fixed to a base plate 100 secured to restrainer block 22. The upper and lower units 82 and 84 are interconnected to pivotally move in unison toward and away from each other by a pair of intermeshing gears 102 and 104 of the same diameter received on and keyed to shafts 94 and 96 respectively. The upper and lower units may be manually moved in unison to their opened and closed positions by an actuator handle 106 extending transversely through and fixed to pin 94.

In using bonding apparatus 20 handles 106 are manually manipulated to move the upper and lower units 82 and 84 of each heater assembly to their open position (as shown in phantom line in FIG. 6) and hydraulic fluid under pressure is admitted to ram assembly 16 to retract both slides 12. A brake lining 20 with a layer of uncured bonding material 24 on the inner face thereof is inserted in cavity 72 of each restrainer block 22 with its outer face bearing on surface 74, opposed ends engaged by spring clips 78 and lower edge resting on lip 76. A brake shoe 14 is positioned and retained on each slide 12 by positioning one end of its arm 50 on locator 48 and engaging the other end of its arm in retainer assembly 46 by retracting pin 52 and then extending it through the hole 54 in the arm.

Hydraulic fluid under pressure is admitted to ram assembly 16 to extend its piston rod 36 and thereby extend slides 12 to force the tables 18 of the brake shoes into firm engagement with the brake linings. Preferably the ram assembly produces a force in the range of about 1,000 to 2,000 pounds per square inch of the interface between the lining and table of each brake shoe.

Handle 106 of each heater assembly is manually manipulated to move its upper and lower heater units 82 and 84 to their fully closed position shown in FIG. 6 which locates electric heaters 86 closely adjacent the rear face of the table 18 of each brake shoe. An electric current is supplied to the heater elements 86 to heat the bonding material to its curing temperature. After the bonding material 24 has been maintained at its curing temperature for the length of time required for curing thereof, the electric current applied to heater elements 86 may be turned off and handles 106 manually manipulated to move the heater assemblies to their open position.

After the brake shoes with the linings bonded thereto have cooled to a low enough temperature so that the bond will not be adversely affected by release of the force urging the shoes and liners together, the hydraulic fluid supplied to ram 16 to extend its rod 36 is relieved and fluid is supplied to the ram to retract plunger 36 and hence slides 12 with the brake shoes thereon. The shoes with bonded linings may be cooled under either ambient or forced air conditions. The brake shoes with the linings bonded thereon are released and removed from the slides and then apparatus 10 is ready to begin another bonding cycle.

I claim:

1. An apparatus for bonding brake linings to tables of brake shoes with an application of heat and pressure which comprises; a restrainer member having a cavity constructed and arranged to receive a brake lining therein, said cavity having a generally arcuate wall constructed and arranged to be complimentary with the outer face of a brake lining received in said cavity, a carrier member adapted to be moved toward and away from said cavity of said restrainer member and constructed and arranged to receive and position a brake shoe such that the outer face of the table thereof may be urged into firm engagement with the inner face of a brake lining received in said cavity of said restrainer member, drive means for moving said carrier member toward and away from said restrainer member to extend and retract the table of a brake shoe carried thereby into and from said cavity of said restrainer member, and a pair of heater units each having at least one heater element and constructed and arranged such that when said carrier member is moved by said drive means to urge the outer face of the table of the brake shoe carried thereby into firm engagement with the inner face of the brake lining received in said cavity of said restrainer member such heater units can be moved to a first position wherein their heater elements lie behind and closely adjacent the inner face of the table of the brake shoe on opposite sides thereof and to a second position sufficiently distal from said cavity and the brake shoe to permit retraction of said carrier member from said cavity by said drive means and removal of the brake shoe with the liner bonded thereto from said carrier member.

2. The apparatus of claim 1 wherein said heater elements comprise electric heater elements.

3. The apparatus of claim 1 wherein each of said heater units is pivotly mounted and constructed and arranged to be moved along a generally arcuate path to said first and second positions of said heater units.

4. The apparatus of claim 1 wherein each of said heater units is pivotly mounted, and said heater units are mechanically operably interconnected and constructed and arranged so that they move in unison along generally arcuate paths to said first and second positions of said heater units.

5. The apparatus of claim 4 wherein said heater units are mechanically operably interconnected by a pair of intermeshed gears each connected to one of said heater units for rotation therewith as said heater units move in generally arcuate paths to said first and second positions thereof.

6. The apparatus of claim 1 wherein said cavity of said restrainer member also comprises a lip projecting inwardly from said arcuate wall adjacent the lower edge thereof and constructed and arranged to permit an edge of a brake lining to rest thereon.

7. An apparatus for bonding brake linings to the tables of brake shoes with an application of heat and pressure comprising; a pair of spaced apart restrainer members each having a cavity therein opening toward the cavity in the other restrainer member and being spaced apart in generally opposed face to face relationship to each other, each of said cavities having a generally arcuate wall complimentary to and constructed and arranged to bear on the outer face of a brake lining received in such cavity, a pair of spaced apart carrier members received between said cavities and each constructed and arranged to receive and position a brake shoe such that when such carrier member is moved to a first position the outer face of the table of the shoe may be urged into engagement with the inner face of the lining received in the associated restrainer member, drive means operably associated with said carrier members and constructed and arranged to move each of said carrier members to said first position and to a second position to retract the brake shoes from the cavities, and a pair of heater units associated with each of said cavities and each having at least one heater element, and each pair of said heater units being constructed and arranged such that when said carrier members are moved by said drive means to said first position thereof each pair of heater units is movable to a first position in which said heater elements are disposed behind and adjacent the inner face of the table of the associated brake shoe on opposite sides thereof to heat the front face of the table to a bonding temperature, and movable to a second position sufficiently distal from such first position to permit the associated carrier member to be moved to said second position thereof to retract the associated brake shoe with the lining bonded thereto and to permit removal of such associated brake shoe and bonded lining from such associated carrier member.

8. The apparatus of claim 7 wherein said drive means comprises a fluid actuated ram received between said carrier members and constructed and arranged to retract said carrier members to said second position thereof and both extend said carrier members to said first position thereof and apply sufficient force to said carrier members when in said first position to force the outer face of the table of the shoe associated with each carrier member into firm engagement with the inner face of the lining received in its associated restrainer member.

9. The apparatus of claim 8 wherein said ram is constructed and arranged to produce a force of at least 1,000 pounds per square inch of the interface between the linings and the tables of the shoes.

10. The apparatus of claim 8 wherein said restrainer members are interconnected by tie rails and said carrier members are slidably carried by said tie rails for movement of said carrier members to said first and second positions thereof.

* * * * *